(12) United States Patent
Lutter

(10) Patent No.: US 6,958,124 B2
(45) Date of Patent: Oct. 25, 2005

(54) SPM SENSOR AND PROCESS FOR PRODUCING IT

(75) Inventor: Stefan Lutter, Nauchâtel (CH)

(73) Assignee: NanoWorld AG, Nauchatel (CH)

( * ) Notice: Subject to any disclaimer, the term of this patent is extended or adjusted under 35 U.S.C. 154(b) by 0 days.

(21) Appl. No.: 10/385,060

(22) Filed: Mar. 10, 2003

(65) Prior Publication Data

US 2004/0046119 A1 Mar. 11, 2004

(30) Foreign Application Priority Data

Mar. 20, 2002 (EP) .............................. 02006227

(51) Int. Cl.$^7$ .............................. C23F 1/00; B44C 1/22
(52) U.S. Cl. .............................. 216/11; 216/2; 250/306; 250/307; 250/309; 250/310
(58) Field of Search ................. 250/306, 307, 250/309, 310, 234; 216/2, 11; 73/105; 324/318

(56) References Cited

U.S. PATENT DOCUMENTS

| | | | | |
|---|---|---|---|---|
| 5,580,827 A | * | 12/1996 | Akamine ..................... | 216/2 |
| 5,619,139 A | * | 4/1997 | Holczer et al. ............. | 324/318 |
| 5,811,017 A | * | 9/1998 | Matsuyama ................. | 216/11 |
| 5,923,033 A | * | 7/1999 | Takayama et al. .......... | 250/234 |
| 6,000,280 A | * | 12/1999 | Miller et al. ................ | 73/105 |
| 6,267,005 B1 | * | 7/2001 | Samsavar et al. .......... | 73/105 |
| 6,666,075 B2 | * | 12/2003 | Mancevski et al. ......... | 73/105 |
| 6,668,627 B2 | * | 12/2003 | Lange et al. ................ | 73/105 |
| 2002/0043101 A1 | * | 4/2002 | Naitou et al. ............... | 73/105 |
| 2003/0196988 A1 | * | 10/2003 | Lutter ......................... | 216/2 |
| 2004/0007053 A1 | * | 1/2004 | Lutter et al. ............... | 73/105 |

FOREIGN PATENT DOCUMENTS

| | | |
|---|---|---|
| EP | 0 413 042 | 2/1991 |
| EP | 0 468 071 | 1/1992 |
| JP | 08262040 | 10/1996 |
| JP | 08313541 | 11/1996 |
| JP | 09105755 | 4/1997 |
| WO | WO/97 44631 | 11/1997 |

\* cited by examiner

*Primary Examiner*—Frank G. Font
*Assistant Examiner*—Mary El-Shammaa
(74) *Attorney, Agent, or Firm*—Bachman & LaPointe, P.C.

(57) ABSTRACT

SPM sensor comprising a holding element, cantilever and a sensor tip, which projects out of the surface of the cantilever, at the free end of the cantilever, at least the cantilever and the three-surface sensor tip consisting of monocrystalline (100)-silicon, and a process for producing this sensor. The process is distinguished by inexpensive process steps, substantially wet-chemical etching steps. The result is that an SPM sensor with a rectangular cantilever arm having a tip which may or may not project beyond the free end is produced from a single piece.

6 Claims, 9 Drawing Sheets

Fig. 19a

SPM SENSOR AND PROCESS FOR PRODUCING IT

BACKGROUND OF THE INVENTION

The present invention relates to an SPM sensor and to a process for producing sensors of this type.

Scanning probe microscopes (SPMs) are generally known and are used in practice to scan the surface of specimens using fine sensors of atomic resolution. SPMs include what are known as STMs (Scanning Tunneling Microscopes) and AFMs (Atomic Force Microscopes), which are likewise generally known.

All these known microscopes use sensors which comprise a micro-scale bending bar, referred to below as a cantilever, which at one end has a holding element and at the other end has a sensor tip, by means of which the specimen is scanned. This sensor tip, which is arranged at the free end of the cantilever, may be shaped in such a way that it does or does not project beyond the free end. The particular sensors used depends on installation in the corresponding microscope; there are situations in which the tip in the microscope is covered, so that alignment can only be carried out with difficulty.

SPM sensors of the type described above are known, for example, from U.S. Pat. No. 5,811,017. In this case, the starting material is a composite material comprising silicon on an insulator (Silicon on Insulator (SOI)), in which at least three lithography steps are required in order to fabricate an SPM sensor with holding element, rectangular cantilever and sensor tip made from silicon. The use of SOI materials as starting material is significantly more expensive than monocrystaline silicon. In this process, an expensive single-wafer dry-etching process is required for fabrication of two of the three surfaces which delimit the sensor tip.

U.S. Pat. No. 5,021,364 has likewise disclosed an SPM sensor, in which a silicon sensor tip is arranged, for example, on a nitride cantilever. The cantilever material is deposited and is therefore not a bulk material. In this case too, expensive single-wafer dry-etching processes are used to etch through the silicon membrane and to fabricate a cantilever or two of the three surfaces which delimit the sensor tip.

Therefore, the present invention is based on the object of producing a SPM sensor from a starting material which costs as little as possible and requires the minimum possible number of process steps, in order to minimize production costs.

SUMMARY OF THE INVENTION

The foregoing object is achieved by an SPM sensor comprising a holding element, cantilever and a sensor tip, which projects out of the surface of the cantilever, at the free end of the cantilever, at least the cantilever and the three-surface sensor tip consisting of monocrystalline (100)-silicon, and a process for producing this sensor. The process is distinguished by inexpensive process steps, substantially wet-chemical etching steps. The result is that an SPM sensor with a rectangular cantilever arm having a tip which may or may not project beyond the free end is produced from a single piece.

Accordingly, in the SPM sensor, at least the cantilever and the three-surface sensor tip, and preferably the entire SPM sensor, including the holding element, consist of monocrystalline (100)-silicon. A sensor of this type is distinguished by the fact that it can be produced at particularly low cost by means of in some cases identical process steps with a sensor tip which projects beyond the free end or with a sensor tip which is covered by the free end, and in addition relatively inexpensive process steps can be used for this purpose.

The method of production results in the formation of an SPM sensor having a substantially rectangular cantilever, which, when seen from above, advantageously has a rectangular arm region and an adjoining triangular tip region which tapers to a point. The tip region is formed by inclined, slow-etching crystal planes and includes an angle of approximately 62°. In a variant (projecting sensor tip), the arm region is delimited at the side faces by a (111)-crystal plane. In this case, on the top side of the cantilever the sensor tip is formed from (100)-silicon with three surfaces, of which two surfaces face away from the cantilever and one surface faces toward the arm region. In this case, the two surfaces are defined by the two inclined, slow-etching crystal planes, and the one surface is defined by a (111)-crystal plane.

According to one embodiment, in which the sensor tip does not project beyond the end of the cantilever, the intersecting edge of the two surfaces facing away from the cantilever forms an angle of approximately 70° with the cantilever underside.

In another embodiment, in which the sensor tip does project beyond the end of the cantilever, the intersecting edge of the two surfaces facing away from the cantilever forms an angle of approximately 70° with the top side of the cantilever.

The angles of approximately 70° result from the three-dimensional arrangement of the individual lattice planes of the silicon crystal. Fluctuations in the angle's size can only result within narrow ranges of +/−10° as a result of the temperature management and/or the concentration of the etching chemical in the etching operation.

Corresponding statements also apply to a lesser extent for the angle of approximately 62° (+/−2°).

The particular feature of the process as a whole consists in the fact that the process is carried out starting from a monocrystalline (100)-silicon wafer, and therefore the entire production process can be carried out in one batch run. Furthermore, compared to the prior art, only a single dry-etching process and therefore more inexpensive wet-chemical etching processes are carried out. To produce the SPM sensor with a protruding sensor tip, all the lithography steps used to produce the holding element, cantilever and tip are carried out from the same side, the opposite side from the sensor tip, i.e. the wafer underside. The wafer top side is understood as meaning the side on which the sensor tip is formed. Accordingly, the opposite side is the underside of the wafer. Thinning steps in this context are not understood to be shaping steps. In the case of the sensor with a protruding sensor tip, all that is carried out on the wafer top side is a thinning step over the entire surface, which is used to set the cantilever thickness and in which the sensor tip is formed.

BRIEF DESCRIPTION OF THE DRAWINGS

The invention explained with reference to the accompanying drawings, wherein.

DETAILED DESCRIPTION

Figure 1:
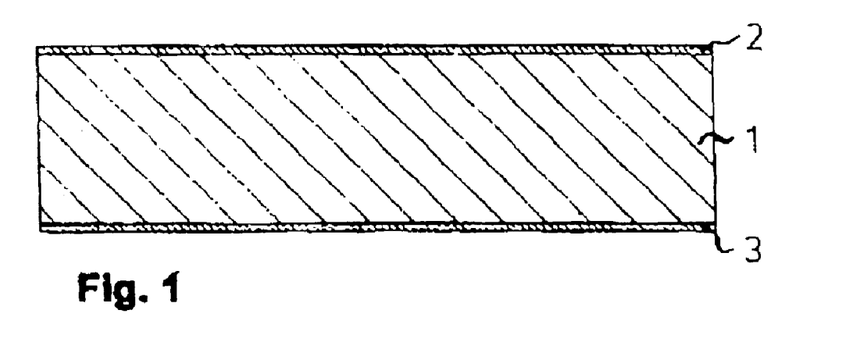
FIGS. 1 to 9a show the individual steps involved in the production of an SPM sensor having a sensor tip which does not project beyond the free end of the cantilever.
Figure 2:
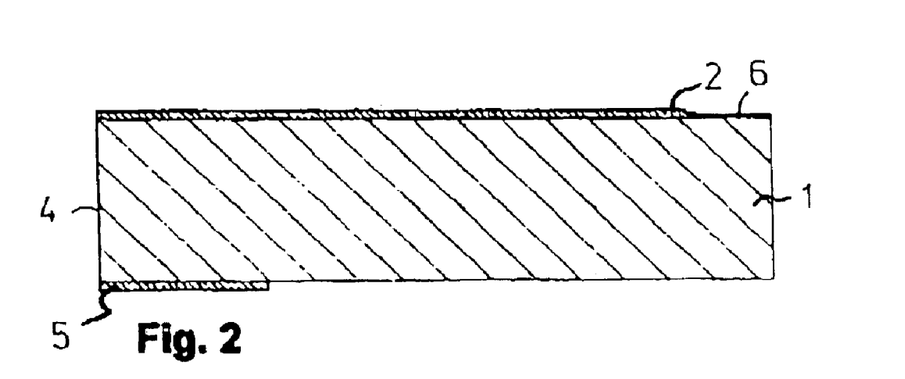

FIG. 1 shows a (100)-silicon wafer 1, in which the top side has been coated with a silicon oxide layer 2 and the underside has been coated with a silicon oxide layer 3. Next, as shown in FIG. 2, the mask for producing the holding element 4 is fabricated as a result of a photoresist being applied to the wafer underside and patterned and the photomask being transferred to the silicon oxide layer 3. The silicon oxide layer 3 on the wafer underside is in the process partially removed, so that only the region 5 for the holding element 5 remains in place. The wafer top side with the silicon oxide layer 2 is covered by a protective resist. All the photoresists which have been applied are also eliminated following the removal of the silicon oxide layer 3.

In the next step, to fabricate the mask for producing the cantilever and the cantilever tip, a photoresist is applied to the wafer top side and patterned, and the photomask is transferred to the silicon oxide. The silicon oxide layer 2 on the wafer top side is partially thinned in the region 6. Then, the photoresist is removed. FIG. 2 shows the result of these process steps.

Figure 3:
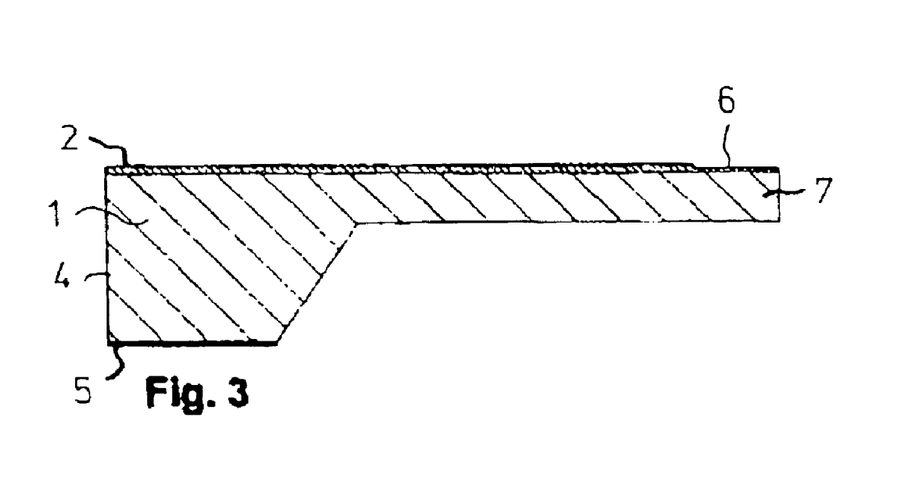

After the thinning of the silicon wafer 1 by wet-chemical etching, for example by means of aqueous potassium hydroxide (KOH) solution, from the underside of the wafer, a thin silicon membrane 7 as illustrated in FIG. 3 is formed. At the same time, the silicon oxide layer 5 is also thinned. The production of the silicon membrane 7 also produces the holding element 4. The thickness of the silicon membrane 7 is selected in such a way that in total it at least corresponds to the desired height of the sensor tip which is subsequently to be produced and the desired final thickness of the cantilever of the SPM sensor.

Figure 4:
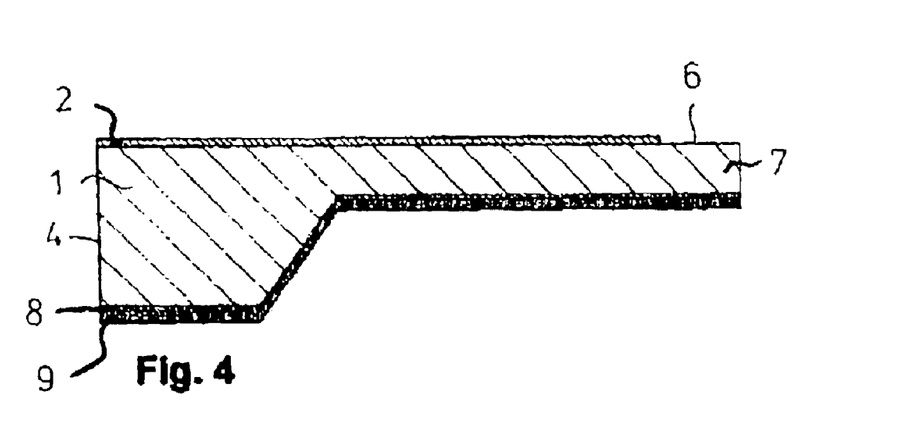

In the next step, another silicon oxide layer 8 is applied to the back surface of the silicon wafer 1, followed by a silicon nitride layer ($Si_xN_y$) 9. Then, the silicon oxide layer 2 on the top side and the silicon nitride layer 9 on the underside are thinned, the mask consisting of silicon oxide for producing the cantilever on the wafer top side being transferred to the silicon substrate 1 in the region 6 (FIG. 4).

Figure 5:
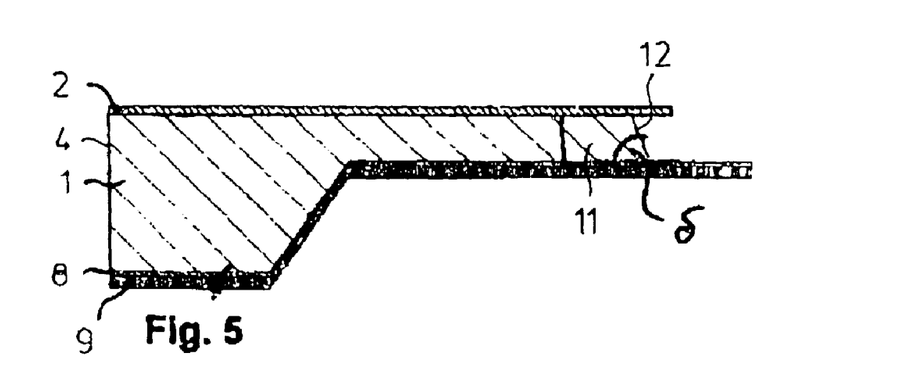
Figure 5A:
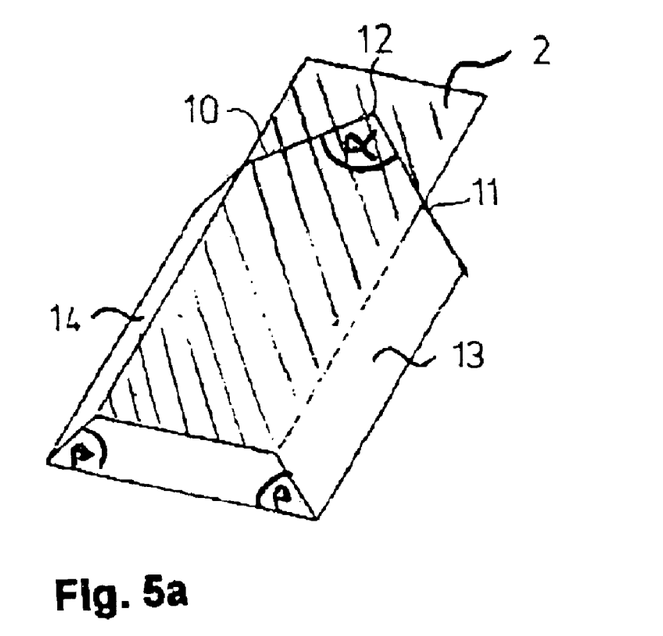

By further partial removal of the silicon membrane 7 in a wet-chemical etching step by means of, for example, an aqueous KOH solution, the cantilever mask facing in the (110)-direction is undercut-etched out of the silicon oxide layer 2, in such a manner that the cantilever which forms at the free end is delimited by two intersecting, slow-etching planes 10, 11. In the exemplary embodiment, these are (014)-planes. Their planes form an angle α of approximately 62°. FIG. 5a shows a perspective view of the formation of the cantilever tip 12. The rectilinear intersection of these planes, i.e. the front boundary of the cantilever, which forms the front edge 12, forms an angle δ, which amounts to approximately 70°, with the (100)-crystal plane which delimits the cantilever underside. At the same time, the side faces 13, 14 are formed with the angle β and consist of (111)-crystal planes. The formation of the sensor tip can therefore be set reproducibly. FIG. 5 shows the result of this step in section and FIG. 5a shows the result of this step in a perspective view.

Figure 6:
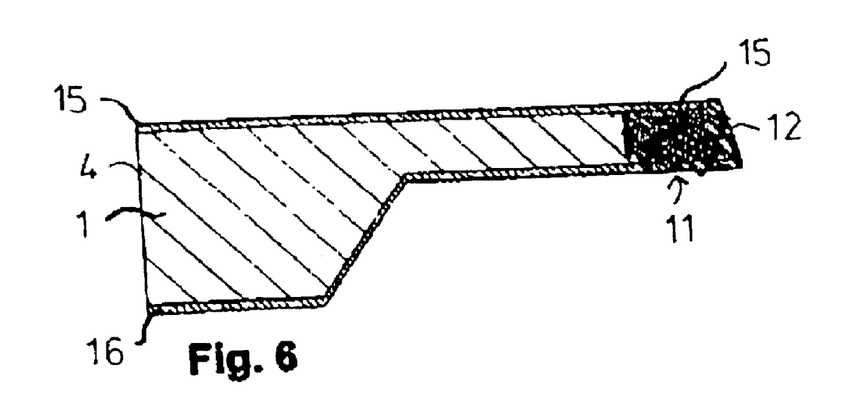

In the next step, all the silicon oxide and silicon nitride layers are removed, and a silicon oxide layer 15 and 16 is again applied to the wafer top side and underside, respectively. At the same time, the surfaces 10 to 14 are also coated with a corresponding silicon oxide layer. The result is shown in the sectional illustration presented in FIG. 6.

Figure 7:
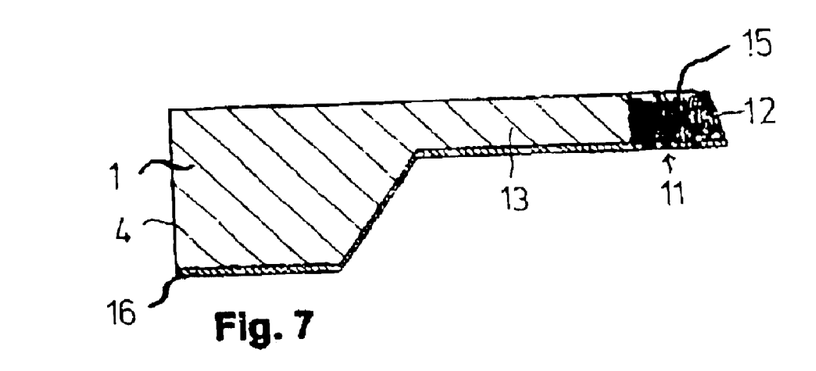
Figure 7A:
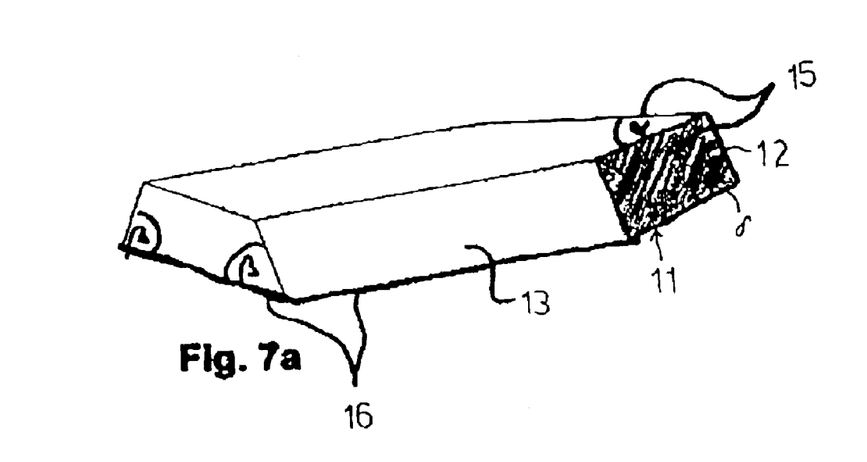

Then, the pre-patterned silicon wafer, as shown in FIGS. 7 and 7a, is subjected to a targeted, angle-dependent dry-etching step in order to remove certain parts of the silicon oxide layer which has been applied. The dry-etching step is selected in such a way that the silicon oxide layer 15 on the wafer top side and the silicon oxide layers which have been applied to the surfaces 13 and 14 are removed, while the two planes 10, 11 which delimit the two open sides of the cantilever and are at a steeper angle with respect to the (100)-crystal planes of the wafer top side than the (111)-crystal planes 13, 14, remain covered by the silicon oxide layer. The underside of the silicon wafer also remains covered by the oxide layer 16.

Figure 8:
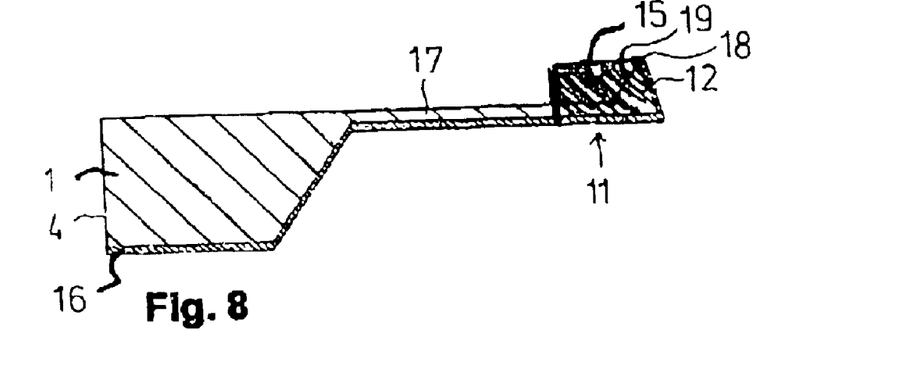
Figure 9:
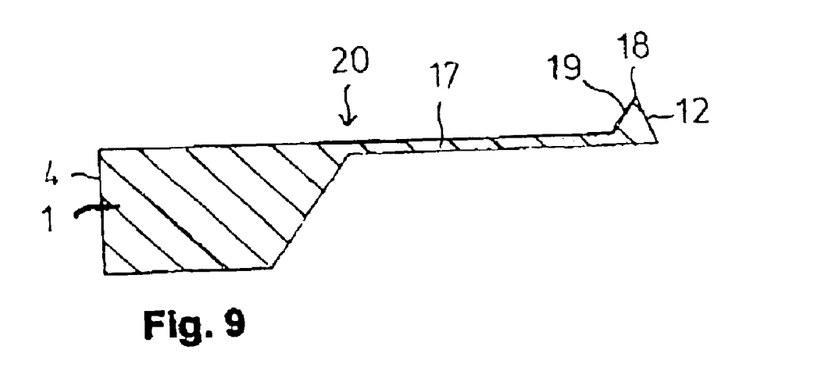
Figure 9A:
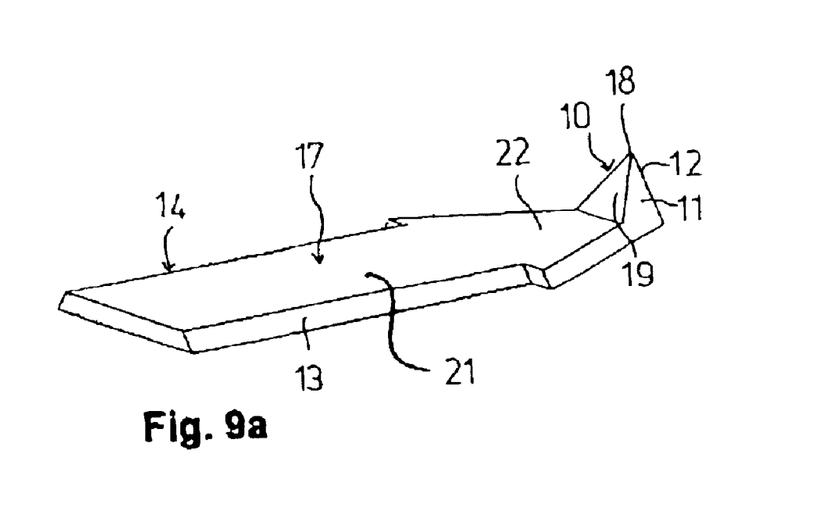

In a subsequent wet-chemical etching step, for example using aqueous potassium hydroxide (KOH) solution, the silicon wafer is thinned to the desired thickness of the cantilever 17. In the process, a sensor tip 18 which is delimited by three surfaces is formed at the free end of the cantilever 17. Two of these surfaces are parts of the intersecting planes 10, 11 at the free end of the cantilever. The third plane comprises a (111)-crystal plane 19 which forms during the thinning of the cantilever. FIG. 8 shows the result of this step, the silicon oxide layers on planes 10, 11 remaining in place. These are removed in the next step (FIG. 9). Since the lateral boundary surfaces of the cantilever 17 are also etched during the wet-chemical etching step, while the planes 10, 11 which delimit the open cantilever end are covered by a silicon oxide layer, a cantilever geometry as illustrated in FIG. 9a is formed. The lateral boundary surfaces 13, 14 of the rectangular part now no longer comprise (111)-crystal planes, but rather comprise flat planes.

According to this process, an SPM sensor is produced from monocrystalline (100)-silicon and has a rectangular cantilever 17, the open end of which is closed off by a triangle. At the end of this triangle there is a sensor tip 18 which is made from silicon and is defined by two sides 10, 11 of this triangle and one (111)-crystal plane. The sensor tip 18 which is formed can be sharpened by a further low-temperature oxidation, for example at below 1000° C., and subsequent removal of the layer of oxide which is grown on. The SPM sensor has a tip 18 which does not project beyond the free end of the cantilever 17.

FIGS. 10 to 19 show the production of an SPM sensor, the sensor tip of which projects beyond the cantilever end.

Figure 10:
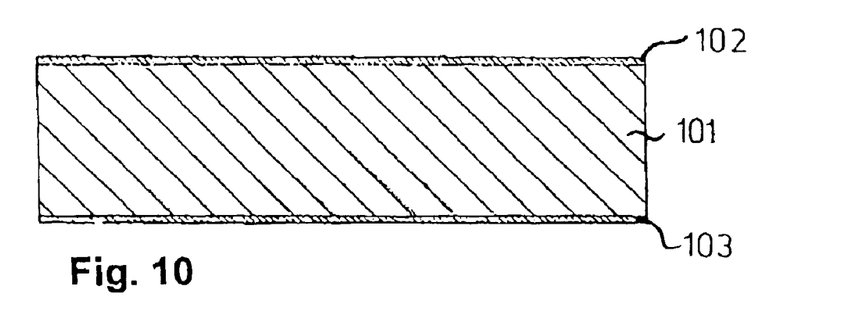
FIGS. 10 to 19 show the individual steps involved in producing an SPM sensor having a sensor tip which projects beyond the free end of the cantilever.
Figure 11:
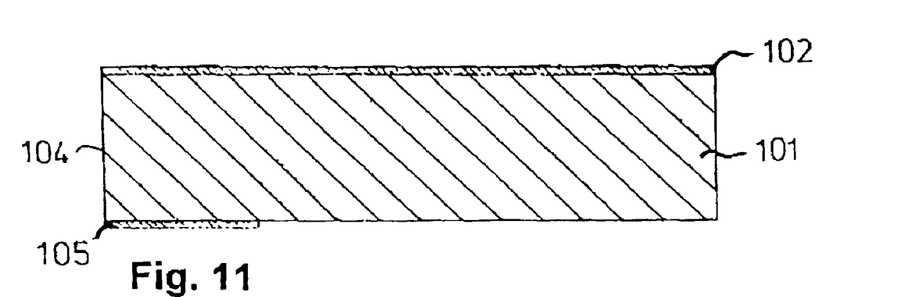
Figure 12:
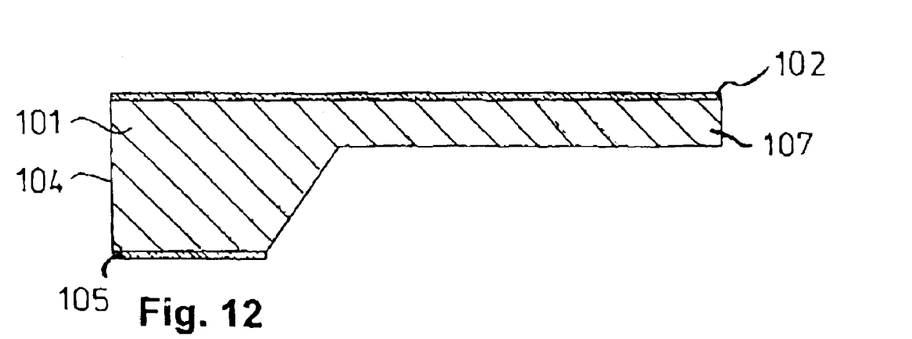

The first two process steps, the results of which are illustrated in FIGS. 10 and 11, are identical to the process steps which have already been described above in connection with FIGS. 1 and 2. Consequently, in FIG. 11 there is a silicon oxide layer 102 on the top side of the silicon wafer 1 and a residual remainder 105 of the silicon oxide layer 103 arranged on the underside in order to form the holding element 104. In the next step, in a corresponding way to the operation described in connection with FIG. 3, the silicon wafer is thinned from the underside of the wafer, so that a silicon membrane 107 is formed. This step produces the holding element 104. The thickness of the silicon membrane 107 is selected in such a way that it corresponds to the sum of at least the desired height of the sensor tip and the desired final thickness of the cantilever of the SPM sensor. The result is illustrated in FIG. 12.

Figure 13:
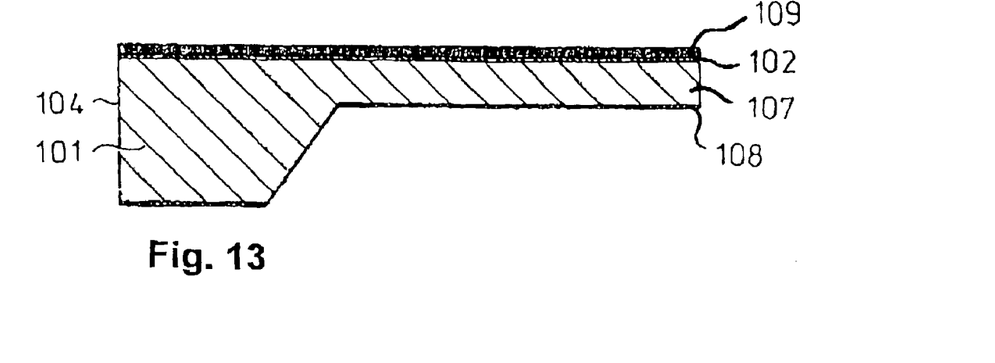

Then, after the removal of the layer 105, the silicon wafer is oxidized, so that the silicon oxide layer 108 is formed on the underside. A silicon nitride layer ($Si_xN_y$) 109 is applied to the top side (FIG. 13).

Figure 14:
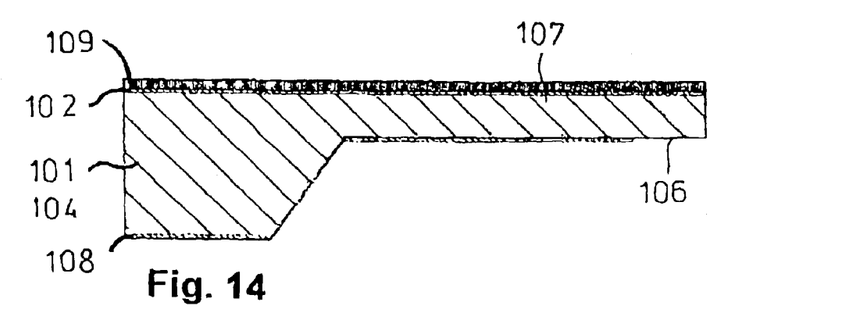

Unlike the exemplary embodiment described above, in this case first of all the mask for producing the actual cantilever is fabricated as a result of a photoresist being applied to the wafer underside, for example using spray-coating processes, and patterned, preferably by means of projection lithography. The photomask is transferred to the silicon oxide layer 108, the silicon nitride layer 109 on the wafer top side being thinned. The result of this step is shown in FIG. 14, from which it is possible to see a region 106 from which the silicon oxide layer 108 has been removed at the end of the silicon membrane 107.

Figure 15:
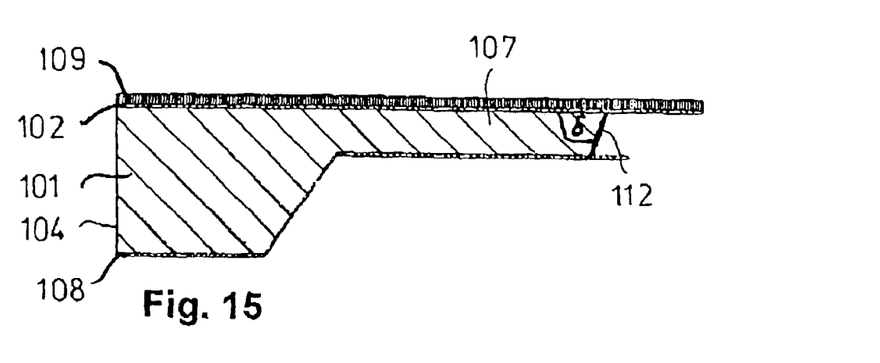
Figure 15A:
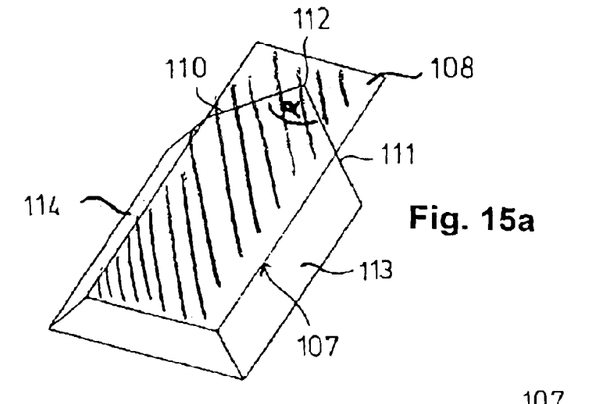

In the next step, the cantilever is produced in accordance with the exemplary embodiment discussed above by partial removal of the silicon membrane in a wet-etching step, for example by means of an aqueous KOH solution. In this case too, the cantilever mask which is formed by the silicon oxide layer 108 and faces in the (110)-crystal-plane direction, is subjected to undercut etching. The cantilever which forms is delimited at the end 112 by two intersecting, slow-etching crystal planes ((014)-crystal planes in the exemplary embodiment) 110 and 111, which form an angle α of approximately 62°. This can be seen from FIG. 15a, which shows a perspective illustration, from the underside, of the silicon membrane 107 for the subsequent cantilever. The rectilinear intersection 112 of these planes forms an angle δ, which amounts to approximately 70°, with the (100)-crystal plane which delimits the cantilever top side. The side faces 113 and 114 likewise comprise (111)-crystal planes. This is likewise illustrated in FIGS. 15 and 15a. In this case too, therefore, the sensor tip can be produced reproducibly.

Alternatively, the cantilever may simply be pre-patterned without the silicon membrane 107 being etched through, so that the silicon wafer remains continuous. This can be achieved by selecting a sufficient thickness of the silicon membrane from the outset.

Figure 16:
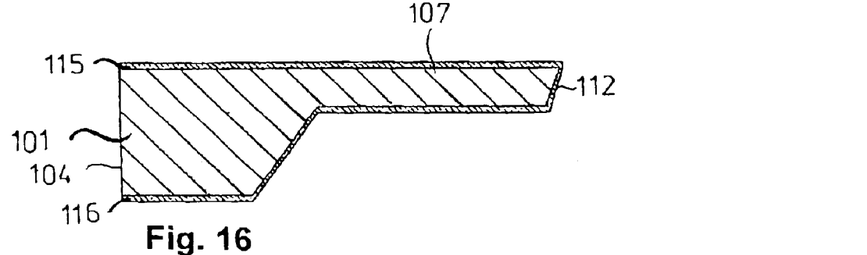

In the next step, once again, as in the previous exemplary embodiment, all the silicon oxide and silicon nitride layers 102, 108, 109 are removed, and a silicon oxide layer 115 is applied to the wafer top side and a silicon oxide layer 116 is applied to the underside, also covering the inclined surfaces 110, 111, 113, 114 and the edge 112. The result is illustrated in FIG. 16.

Figures 17, 17A:
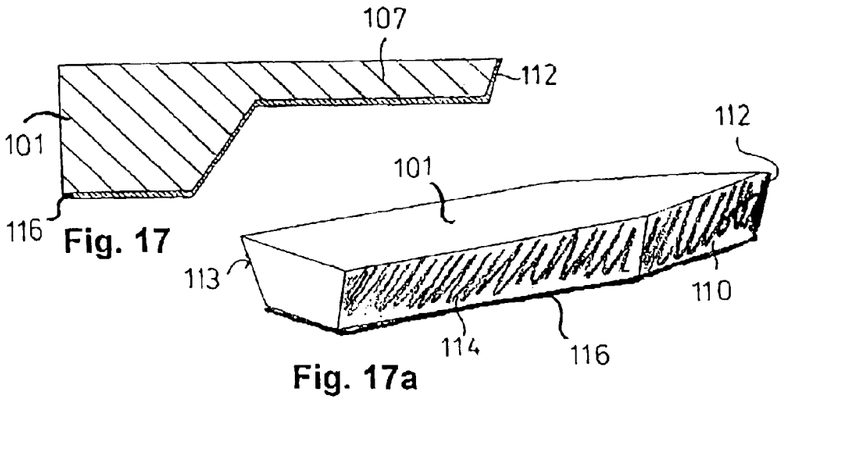

This pre-patterned silicon wafer is then subjected to a targeted dry-etching step for removal of certain parts of the applied silicon oxide layers 115, 116. The dry-etching step is selected in such a way that the silicon oxide layer 115 is removed from the (100)-crystal plane which delimits the cantilever top side. All the side faces 110, 111, 113, 114 remain covered by the silicon oxide layer. The silicon oxide layer 116 is also retained. The result is illustrated in FIGS. 17 and 17a and shows the surfaces which are still covered with silicon oxide.

Alternatively, in the case of the variant given above, in which the silicon membrane is not etched through, it is possible to remove only the silicon oxide from the top side of the wafer.

Figure 18:
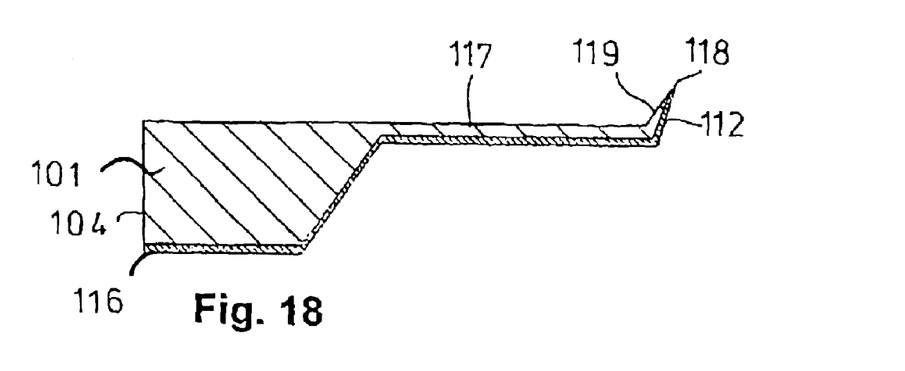

In the following wet-chemical etching step, the cantilever 117 is thinned to the desired thickness. A sensor tip 118 which is delimited by three surfaces 110, 111, 119 is formed at the free end of the cantilever. The two surfaces 110, 111 are parts of the intersecting planes in the formation of the cantilever tip shown in FIGS. 15 and 15a. The third plane comprises a (111)-crystal plane 119 which is formed during the thinning of the silicon membrane 107 (FIG. 18).

Figure 19:
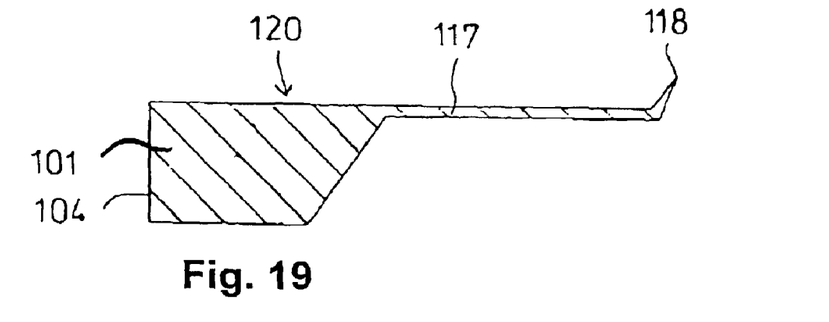
Figure 19A:
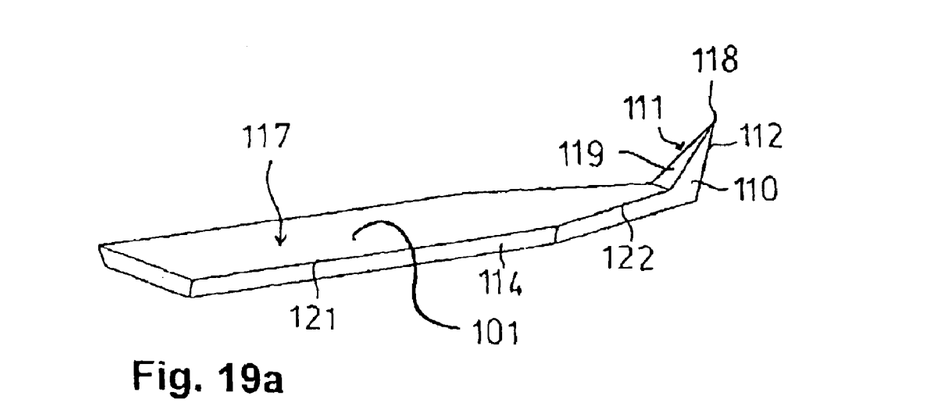

Finally, the remaining silicon oxide layer 116 on the underside and on the side faces 110, 111, 113, 114 and at the edge 112 is removed, resulting in the formation of an SPM sensor 120 as shown in FIG. 19. The corresponding cantilever 117 is shown in FIG. 19a.

In both exemplary embodiments, the two slow-etching surfaces 10, 11 or 110, 111 face away from the cantilever 17 or 117, while the third (111)-crystal plane 19 or 119 which forms the tip 18 or 118 faces in the direction of the cantilever 17 or 117. The cantilevers 17, 117 illustrated in FIGS. 9a and 19a have a rectangular region 21 or 121, which is adjoined by a tip region 22 or 122 which tapers to a point and includes the sensor tip 18 or 118.

The curvature of the edge 112 and the resulting angle with respect to the cantilever top side depends on the temperature control and/or the concentration of the etching chemicals. The angle may be set between 60° and 80° by means of minor alterations to the parameters used.

The typical height of the sensor tip 18, 118 is in the range from 5–25 μm, and the thickness of the cantilever 17, 117 is in the range from 0.5–10 μm. The wafer starting material has a thickness of 300–500 μm, and the silicon oxide and silicon nitride layers are in the region of a few 100 nm.

What is claimed is:

1. A monolithic SPM sensor (20, 120) comprising a holding element (4, 104), cantilever (17, 117) and a three-surface sensor tip (18, 118), which projects out of a surface of the cantilever at a free end of the cantilever, wherein the holding element (4, 104), the cantilever (17, 117) and the three surface sensor tip (18, 118) are made from one monocrystalline (100)-silicon, wherein the cantilever (17, 117) is made from the monocrystalline (100)-silicon with an arm region (21, 121), which is substantially rectangular when seen from above; and an adjoining triangular tip region (22, 122) which tapers to a point, the tip region (22, 122) being formed by inclined, slow-etching crystal planes (10, 11; 110, 111), which are produced by wet-chemical means, wherein the tip region includes an angle of approximately 62°, and a sensor tip (18, 118), which is arranged on the top side of the cantilever (17, 117), is made from (100)-silicon and comprises three surfaces, of which two surfaces (10, 11; 110, 111) face away from the cantilever (17, 117) and one surface (19, 119) faces toward the arm region (21, 121), the two surfaces being defined by the two inclined, slow-etching crystal planes (10, 11; 110, 111), and the one third surface (19, 119) being defined by a (111)-crystal plane.

2. The SPM sensor as claimed in claim 1, wherein the sensor tip (18) does not project beyond the end of the cantilever (17).

3. The SPM sensor as claimed in claim 2, wherein an intersecting edge (12) of the two surfaces (10, 11) forms an angle of approximately 70° with an underside of the cantilever (17).

4. The SPM sensor as claimed in claim 1, wherein the arm region (121) is delimited at side faces (113, 114) by (111)-crystal planes.

5. The SPM sensor as claimed in claim 4, wherein the sensor tip (118) projects beyond the end of the cantilever (117).

6. The SPM sensor as claimed in claim 5, wherein an intersecting edge (112) of the two surfaces (110, 111) forms an angle of approximately 70° with a top side of the cantilever (117).

* * * * *